United States Patent
McGettigan et al.

(10) Patent No.: US 6,795,243 B1
(45) Date of Patent: Sep. 21, 2004

(54) POLARIZING LIGHT PIPE

(75) Inventors: Anthony D. McGettigan, Santa Rosa, CA (US); Clark Pentico, Simi Valley, CA (US); Markus Duelli, Santa Rosa, CA (US); Edward S. Sherman, Santa Rosa, CA (US); John D. Corless, Santa Rosa, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 0 days.

(21) Appl. No.: 10/262,520

(22) Filed: Oct. 1, 2002

Related U.S. Application Data

(60) Provisional application No. 60/327,607, filed on Oct. 5, 2001, and provisional application No. 60/327,608, filed on Oct. 5, 2001.

(51) Int. Cl.[7] .......................... G02B 27/28; G02B 5/30; G02B 6/122; G03B 21/14
(52) U.S. Cl. ...................... 359/486; 359/485; 359/494; 353/20; 385/133; 385/901
(58) Field of Search .......................... 359/486; 362/561, 362/583, 19; 353/20

(56) References Cited

U.S. PATENT DOCUMENTS

| | | | |
|---|---|---|---|
| 3,912,921 A | * 10/1975 | Howe et al. ................. 362/19 |
| 5,398,082 A | 3/1995 | Henderson et al. ......... 348/781 |
| 5,548,347 A | 8/1996 | Melnik et al. .............. 348/761 |
| 5,634,704 A | 6/1997 | Shikama et al. ............ 353/31 |
| 5,748,376 A | 5/1998 | Lin et al. .................... 359/629 |
| 5,909,204 A | 6/1999 | Gale et al. .................. 345/85 |
| 6,108,131 A | * 8/2000 | Hansen et al. .............. 359/486 |
| 6,139,157 A | * 10/2000 | Okuyuma .................... 353/102 |
| 2001/0008470 A1 | 7/2001 | Dewald ....................... 359/850 |
| 2002/0109795 A1 | * 8/2002 | Bruzzone et al. ............ 349/9 |
| 2002/0135874 A1 | 9/2002 | Li ............................... 359/497 |
| 2003/0007245 A1 | * 1/2003 | Edlinger et al. ............ 359/487 |
| 2003/0020839 A1 | 1/2003 | Dewald ....................... 348/743 |

FOREIGN PATENT DOCUMENTS

| | | |
|---|---|---|
| JP | 11-231261 | 8/1999 |

OTHER PUBLICATIONS

D. Scott Dewald et al., *Sequential Color Recapture and Dynamic Filtering: A Method of Scrolling Color*, SID 01 Digest, v. 32, pp. 1076–1079 (2001).

* cited by examiner

*Primary Examiner*—John Juba, Jr.

(57) ABSTRACT

A recirculating light polarizer utilizes a reflective polarizer on the exit face of a light integrator, such as a light pipe or light tunnel. Light is provided to the light integrator and light of one polarization is transmitted through the polarizer, the remaining light being reflected back into the integrator. The back-reflected light accumulates polarization shift before it eventually is reflected back to the polarizer. The reflected light is further homogenized on its trip back to the polarizer. This process is typically repeated several times to enhance the light output from the light pipe assembly, with some light being lost in each cycle due to various loss mechanisms. A polarization state modifier, such as a retarder plate or phase-shifting coatings, may be included in the recirculating light path to enhance polarization shift.

33 Claims, 4 Drawing Sheets

POLARIZING LIGHT PIPE

CROSS-REFERENCE TO RELATED APPLICATIONS

This patent application claims priority from commonly owned U.S. Provisional Patent Application No. 60/327,607 entitled RECIRCULATING LIGHT PIPE, filed Oct. 5, 2001 by Anthony D. McGettigan, Markus Duelli, and Edward S. Sherman; and from U.S. Provisional Patent Application No. 60/327,608 entitled POLARIZING LIGHT PIPE, filed Oct. 5, 2001 by Anthony D. McGettigan, Clark Pentico, Markus Duelli, and Edward S. Sherman, the disclosures of which are hereby incorporated in their entirety for all purposes.

This patent application is being concurrently filed with U.S. patent application Ser. No. 10/262,539 entitled SCROLLING COLOR PROJECTION SYSTEM by Anthony D. McGettigan and Markus Duelli, the disclosure of which is hereby incorporated in its entirety for all purposes.

STATEMENT REGARDING FEDERALLY SPONSORED RESEARCH OR DEVELOPMENT

Not applicable.

REFERENCE TO MICROFICHE APPENDIX

Not applicable.

BACKGROUND

The invention relates generally to a light polarization device, such as are commonly used in projection display systems, and more particularly to a light integrator that provides an enhanced polarized output.

A light integrator, such as a rod or light tunnel, is commonly used for homogenizing the output of an illumination source in projection display systems to provide uniform illumination to a spatial light modulator(s) ("SLM"), but may be used in other applications where it is desired to light from a relatively small source into a larger field of uniform illumination. In some projection display systems, liquid crystal spatial light modulators are used. It is often desirable to illuminate such modulators with polarized light. These modulators rotate the incident polarized light when switched between the "on" and the "off" states.

A light pipe may be a bar or rod of glass, often rectangular, that typically has a relatively small aperture at one end that receives light from a lamp system. The lamp typically has a small arc about 0.7–1.3 mm that generates the light, which is focused onto the aperture with mirrors and lenses. Light emitted by the illumination source enters the aperture on the input face of the light pipe and is reflected off the walls of the light pipe until it is transmitted out the exit face. The light enters the aperture such that the angle of incidence with the wall(s) of the light pipe result in essentially all of the light being reflected back into the light pipe. This type of reflection is commonly referred to as "total internal reflection" ("TIR"). The exit face is frequently shaped to conform to the SLM to provide light that is spatially uniform in intensity.

A light tunnel is another type of light pipe, but rather than being a solid bar, a reflective "box" is formed using metallic mirrors or other reflectors. As with a light rod, light entering the light tunnel is reflected off the walls and is transmitted out the exit face. Since TIR is not relied upon with the mirrored light tunnel, the angle of incidence with the wall of the light tunnel is not as critical. Also, since the light tunnel is typically filled with air or other gas(es), transmission loss through the light tunnel can be relatively low, and other optical effects that might arise in a glass rod, such as birefringence, can be avoided.

It is generally desirable to provide a bright display that is efficient and reliable. Unfortunately, conventional absorptive polarizers can cut the light output essentially in half, depending on the characteristics of the polarizer. Various techniques have been developed to mitigate this loss. One approach is to separate s and p polarized light externally by segregation into focal spots at a virtual image plane. An external polarization rotator rotates the offset focal spots 90 degrees. The light pipe separates the s and p polarization using TIR with a double layer wall of the light pipe that is parallel to the optic axis of the light pipe. The interface between the walls has either a polarization-separating film or thin films with optical birefringence such that the s polarized light undergoes TIR at the inner wall and p polarized light undergoes TIR at the outer wall. An additional optical element deployed externally to the light pipe provides recombination of the focal spots into a rectangular field for illuminating a liquid crystal image modulator.

SUMMARY OF THE INVENTION

A reflective polarizer is coupled to the output of a light integrator to recover non-transmitted light. Light is reflected off the polarizer and re-enters the light integrator, which includes a reflector at a portion of its input face. The light traverses the light integrator from the exit face to the input face and back again through TIR, in the case of a light rod. This re-entrant light is shifted in phase by the reflections before exiting the light integrator. A portion of this phase shifted light is transmitted by the polarizer, thus the light is recaptured.

In one embodiment, phase shifting occurs primarily through reflection, that is, no additional phase shifting elements are required in the system. The light pipe could be made relatively long, increasing the number of "bounces" (reflections) in a round trip between the exit and input faces. Other factors being constant, a longer light pipe would achieve more rotation per round trip at the expense of absorption loss or other loss mechanisms. Alternatively, the light pipe could be relatively short. A short light pipe would not have as many bounces per round trip, but the recovered light could make many round trips. Some of the recovered light is lost out the aperture at the input face, thus it is generally desirable to make the aperture small. Corner reflectors can be added to increase the number of reflections per "trip" without significantly increasing the transmission length.

In another embodiment, a polarization state modifier, such as a circular or form birefringent element or other optically active element, phase-shifting coating, or retarder plate, is placed in the light path between the exit face and the input. A retarder plate can be essentially normal to the optic axis of the light pipe, or off-normal. In a particular embodiment, a phase-shifting coating is applied to the walls of the light pipe to enhance the phase shift occurring with each TIR bounce.

DETAILED DESCRIPTION OF THE INVENTION

I. Introduction

In the present invention a light integrator, such as a light pipe or light tunnel, is combined with a reflective polarizer on its front, or exit, face. Image brightness is increased as light reflected by the polarizer is recirculated within the light integrator to modify its polarization state so that additional light is transmitted through the polarizer. The light integrator can replace other polarizing components, such as a polarizing beam splitter ("PBS"), thus reduce the devices size and cost.

II. Exemplary Polarizing Light Integrators

Figure 1A:
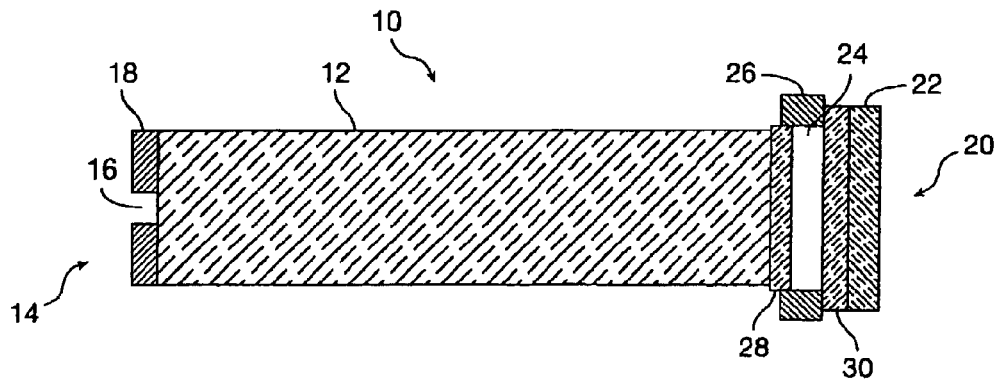
FIG. 1A is simplified cross section of a light pipe assembly according to an embodiment of the present invention.

FIG. 1A is a simplified cross section of a light pipe assembly 10 according to an embodiment of the present invention. The light pipe assembly includes a light pipe 12 made of a transparent material, such as optical glass or plastic. One type of optical glass that can be used for the light pipe is commonly known as BK-7™, available from SCHOTT GLASS TECHNOLOGIES INC. of Duryea, Pa. The input face 14 of the light pipe has an aperture 16 that couples light from a lamp (not shown, see FIG. 5) into the light pipe and a reflector 18 generally over a remaining portion of the input face. The reflector could be a stack of dielectric thin films or a metal film, for example, and in one embodiment achieves a reflectivity of 0.96 over the wavelengths of interest.

The aperture is kept as small as possible, typically less than one-third the area of the input face, to achieve efficient retro-reflection of the recirculating light, while allowing efficient coupling of the light from the lamp through the aperture into the light pipe. The light from the lamp is focused (converged) onto the aperture and coupled into the light pipe. Thus the size of the aperture depends somewhat on the arc length of the lamp and the optics used to focus the light into the aperture. In a particular embodiment, the area of the aperture was 0.21 times the area of the light pipe.

The exit face 20 of the light pipe assembly includes a reflective polarizer 22 coupled to the light pipe 12 across an air gap 24. In most applications, it is desirable to use a linear polarizer, but a circular polarizer or other polarizer might be preferred in other applications. The reflective polarizer is configured such that the reflective plane is essentially normal to the optic axis of the light pipe. A seal 26 mechanically couples the reflective polarizer to the light pipe and isolates the air gap from the ambient atmosphere. The "air" gap can be filled with a selected atmosphere or gas, such as dry nitrogen, if desired. Anti-reflective coatings 28, 30 on either side of the air gap reduce the transmission loss from the light pipe out the reflective polarizer. The reflective polarizer could be a fine-wire polarizer, for example, with the metal grid facing the air gap. Alternatively, the metal grid could face away from the light pipe, eliminating the air gap and associated anti-reflective coatings.

In such embodiments the polarizer might be attached to a light pipe with an optical adhesive. Adhesives used in such assemblies should be reliable over the operating temperature range of the assembly, which can be on the order of 120° C. or higher, and not absorb UV light. UV-curable adhesives are not as desirable because they absorb UV light and tend to heat up and fail, even with a UV filter between the lamp and the adhesive. Adhesives belonging to the group of acrylates or polysiloxen are good candidates for this application, such as are available from NUSIL of Carpenteria, Calif. and ABLESTIK of Rancho Dominguez, Calif. In particular, adhesives exhibiting low light absorption in the short wavelength portion of the visible spectrum are generally desirable. Optical bonding is another technique for attaching a polarizer substrate to the end of a light rod or the perimeter of a light tunnel, which avoids the use of an organic adhesive layer.

A wire-grid polarizer is typically fabricated on a glass substrate, which can contribute birefringence that affects the polarization state of light transmitted through the substrate. Orienting the polarizer so that the wire grid is proximate to the light integrator maximizes the coupling efficiency, and may be particularly desirable when high brightness is desired. Orienting the polarizer so that the wire grid is distal from the light integrator (i.e. so that the substrate is proximate to the light integrator) maximizes the degree of polarization from the emitted light, and thus may be particularly desirable for a high-contrast application. Suitable wire-grid polarizers are sold by MOXTEK of Orem, Utah under the trade name PROFLUX™.

The reflective polarizer 22 transmits light of a selected polarization and reflects light of the non-selected polarization. While polarization is often explained in terms of s and p polarization relative to a plane defined by the light ray and the normal to an interface, wire grid polarizers are often defined by the pass axis of the wire grid. This avoids the ambiguity of defining the reference plane for s and p polarization when the light ray is normal to the interface. Those of skill in the art will appreciate that light having the selected polarization is transmitted through the polarizer, while light having the non-selected polarization is reflected by the reflective polarizer back into the light pipe 12, where it reflects off the walls by TIR, in the case where the integrator is a solid light rod, one or more times until it reaches the input face 14.

Each reflection, or bounce, introduces some polarization phase shift to the light. Some of the re-circulated light escapes out the aperture 16, while most of the remainder is reflected off the reflector 18 on the input face. This light travels back toward the exit face 20, accumulating more phase shift with each bounce. When the recirculated light (now with polarization modification) illuminates the reflective polarizer, additional light passes through the reflective polarizer, thus recovering light. This process can be repeated several times, i.e. light can make several round trips between the exit and input faces, accumulating polarization phase shift until it passes through the reflective polarizer, for the light that is not lost through various mechanisms, such as absorption or back-transmission through the aperture. The light pipe is illustrated as having essentially parallel walls, but the walls could be tapered, generally from a smaller area at the input end to a larger area at the exit end. Alternatively, a light tunnel could be used as a light pipe. A light tunnel essentially uses mirrors to form the walls of a space through which light can propagate by multiple reflections.

The polarizer may cover the entire exit face of the light integrator, or may include a clear portion to enhance brightness. Similarly, wavelength-selective filters may be added in the optical path to adjust the color output of the light integrator, or the polarizer may provide color-balancing.

Figure 1B:
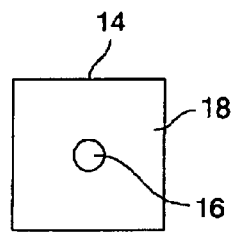
FIG. 1B is a simplified end view of the input face of the light pipe assembly of FIG. 1A.

FIG. 1B is an end view of the input face 14 showing the aperture 16 and the reflector 18. The aperture is nominally centered, but this is not required. Similarly, it is not required that the aperture be round. The light pipe is illustrated as generally square, and in many embodiments is rectangular or other shape. Generally, the cross section of the light pipe matches, or at least shares the aspect ratio, of the subsequent light modulator.

Figure 2A:
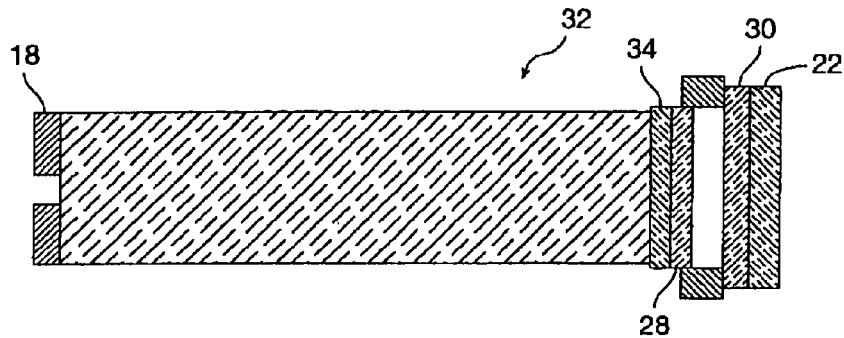
FIG. 2A is a simplified cross section of a portion of a light pipe assembly with a retarder plate according to an embodiment of the present invention.

FIG. 2A is a simplified cross section of a light pipe assembly 32 according to another embodiment of the present invention. A polarization state modifier, which in this embodiment is a retarder plate, 32 is included on the exit end of the light pipe 12. The retarder plate is illustrated between the light pipe and the anti-reflective coating 28, but could generally be anywhere between the reflector and the polarizer. For example, a retarder plate could be placed between the reflector 18 and the light pipe, or the reflective polarizer 22 and the anti-reflective coating 30. The polarization state modifier does not have to be a lumped optical element, such as a retarder plate, but could be a distributed optical element (s). For example, a light pipe might be fabricated from birefringent glass, which modifies the polarization state of the light traveling through it. Such glass might be produced by inducing thermal stress into a glass light pipe, or by doping the glass, so that the polarization state is preferably rotated ninety degrees for each "round trip" through the integrator, but embodiments may operate with more or less polarization modification per round trip.

The retarder plate can be a sheet of stretched plastic, such as a NITTOU sheet retarder, or a polarization rotating crystal, for example single-crystal quartz. In one embodiment, the retarder plate has an optical length of about one-quarter wavelength. In other embodiments, a retardation of $N\lambda/4$ is desired, where N is a non-negative odd integer. The case where N=1 satisfies this condition, but cases where N>1 can provide certain advantages, such as easier fabrication of a retarder plate where N=3 because the plate is thicker and easier to handle. In a particular embodiment, the retarder plate was about 28 microns thick and made of single-crystal quartz.

A retarder where N>1 can also enhance the spectral characteristics of the output. Light sources (e.g. lamps) typically have a non-uniform output spectrum. In other words, some wavelengths have higher in intensity than others. Such lamps are often referred to as being "blue" or "red", depending on which colors are most strongly generated by the lamp. Similarly, it may be desirable to color-balance the light from the recirculating polarizing light integrator to compensate for wavelength-sensitive loss mechanisms that occur in the light recirculating system, or from the polarizer. Selecting a higher-order retarder thickness can modify the color of the recycled light by providing different amounts of retardation to different wavelengths. This in turn affects how many round trips light of a particular wavelength has to make before a certain level of light recovery is obtained. For example, if N=3 at one wavelength, N might equal 2 at another wavelength. The first wavelength would be retarded the in a way to achieve the desired modification of polarization, while polarization modification of the second wavelength would not be as great. Thus, the more of the first wavelength would pass through the polarizer on the second trip, while less of the second wavelength would. Thus, the second wavelength would have to make additional round trips, resulting in additional incidental losses, to achieve the same polarization modification. This would enhance the light provided at the first wavelength relative to the second wavelength, thus achieving color modification. Color modification can be achieved by choosing the design wavelength of the retarder, and the order of the retarder, with higher orders generally producing narrower band behavior.

The illustrated quarter-wave plate rotates the polarization vector about 45 degrees with each pass through the plate, thus the "round trip" polarization rotation through the retarder plate (i.e. two passes) is about 90 degrees. In another embodiment, the retarder plate is selected to rotate the polarization less than 45 degrees each pass so that the sum of the polarization modification arising from twice through the retarder plate and from other polarization modification effects, such as from reflection(s) and birefringence, is about 90 degrees. Those of skill in the art understand that "90 degrees" of rotation means 90 degrees from a reference, such as from the polarization grid, and can be either clockwise or counterclockwise (positive or negative), and that 90 degrees of rotation in a counterclockwise direction is equivalent to 270 degrees of rotation in a clockwise direction.

Figure 2B:
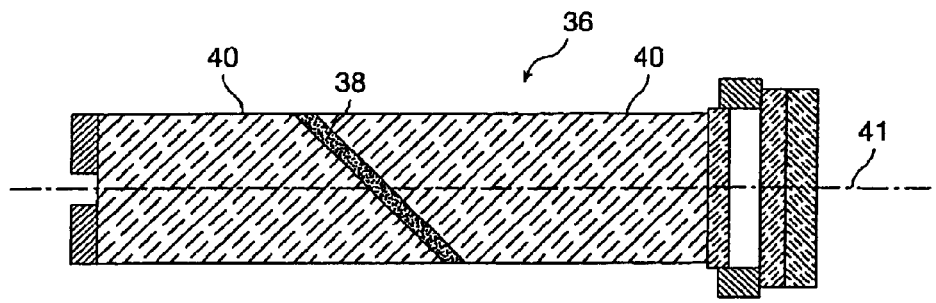
FIG. 2B is a simplified cross section of a light pipe assembly with an oblique retarder plate according to another embodiment of the present invention.

FIG. 2B is a simplified cross section of a light pipe assembly 36 with a phase-control filter 38, e.g. thin-film coating(s), embedded in the light pipe 40 at an oblique angle to the optic axis of the light pipe. In one embodiment, the phase control coating surface forms an angle of about 45 degrees with the optic axis 41 of the light pipe. The oblique orientation is chosen because it can be difficult to achieve the desired polarization rotation with coatings normal to the optic axis. It is generally desirable that about 45 degrees of polarization rotation occur upon each traverse through the phase control coating.

Figure 2C:
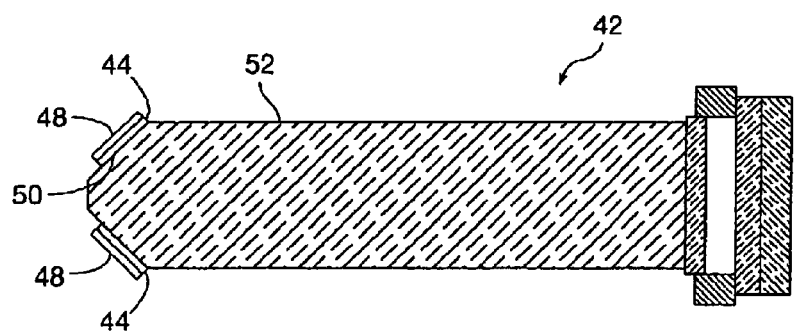
FIG. 2C is a simplified cross section of a light pipe assembly according to another embodiment of the present invention with a phase-control coating on the reflective portion of the input face.

FIG. 2C is a simplified cross section of a light pipe assembly 42 with a phase control coating 44 between the input face 46 of the light pipe 56 and the reflector 48. A portion 50 of the input face is angled to be off-normal to the optic axis of the light pipe to enhance the polarization rotation characteristic of the phase control coating.

Figure 2D:
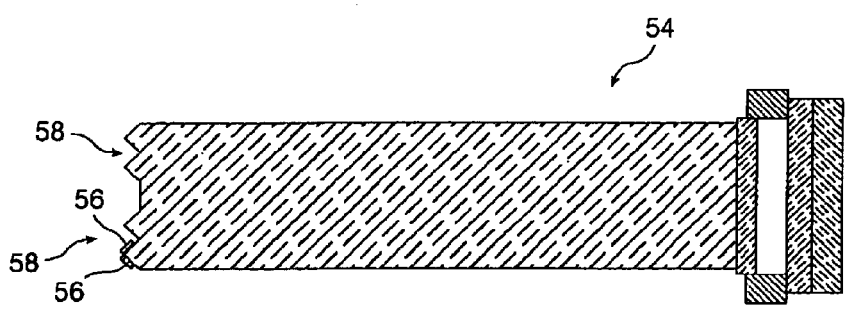
FIG. 2D is a simplified cross section of a light pipe assembly according to an embodiment of the invention with phase-control coating on corner cube reflector-type surfaces.

FIG. 2D is a simplified cross section of a light pipe assembly 54 with an optional phase control coating 56 on one or more surfaces of a corner cube-type reflector 58. The corner cube-type reflector provides an oblique polarization rotation characteristic while reflecting light back along the optic axis of the light pipe, thus achieving higher polarization rotation while maintaining the angle of the light for TIR.

Figure 3:
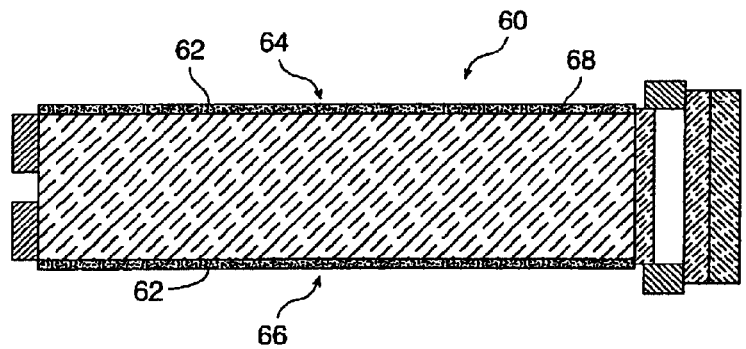
FIG. 3 is a simplified cross section of a light pipe with a phase-control coating on the light pipe walls according to another embodiment of the present invention.

FIG. 3 is a simplified cross section of a light pipe assembly 60 according to another embodiment of the present invention. A phase control coating 62 is applied to at least two walls 64, 66, preferably all four walls, of a rectangular light pipe 68 or light tunnel. The phase control coating is a coating, such as a stack of dielectric thin films, that enhances the polarization rotation obtained from each TIR bounce beyond the polarization rotation that would occur without the phase control coating.

In some applications it is desirable to enhance a portion of the spectrum of light coming out of the light pipe assembly. For example, if a lamp is relatively weak in the red portion of the spectrum, it may be desirable to provide a retarder plate or coating that preferentially transmits red light compared to blue and/or green light. Thus the light pipe assembly achieves some color balancing, and would enhance the relative output of polarized red light compared to a light pipe assembly without color balancing. In particular, the intensity of the polarized red light would be closer to the intensity of the polarized green and/or blue light. A color-balanced light pipe might be desirable for other reasons than compensating the spectral output of a lamp, such as enhancing or balancing other components in a display system, and it might be desirable to enhance other portions of the spectrum. A light pipe assembly according to such an embodiment of the present invention might achieve a wavelength-selective characteristic (i.e. wavelength response) in any one of several or a combination of ways to selectively enhance a portion of the spectrum of the output light.

III. An Exemplary System

Figure 4:
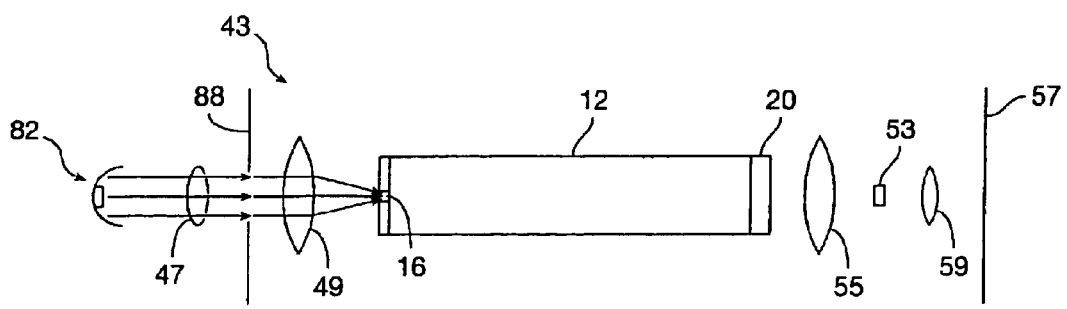
FIG. 4 is a simplified diagram of a display system according to an embodiment of the present invention.

FIG. 4 is a simplified diagram of a display system 43 according to an embodiment of the present invention. A lamp 82 provides light, represented by arrows 47 to a first lens system 49 that focuses the light on the aperture 16 of a light integrator 12. An iris 88 may be used in conjunction with the first lens system. A polarizer 20 transmits light having a selected polarization state and generally reflects light having a non-selected polarization state, thus the light integrator operates as a recirculating polarization light integrator. An optional polarization state modifier may be included in the recirculating polarization system, including distributed polarization state modifiers, such as a light pipe of birefringent glass or multiple phase-shifting coatings on various surfaces of the light integrator, or a component such as a retarder plate. Other optically active polarization modifiers, such as form birefringent elements or circular birefringent elements may be used, either separately or in combination with other polarization state modifiers.

Polarized light from the recirculating polarization light integrator is provided to a light valve 53 through a second lens system 55, such as a condenser lens. In this embodiment the light valve 53 is a liquid crystal light valve that operates as a transmissive device. Other light valves operate as reflective devices, such as liquid crystal on silicon ("LCoS") and ferroelectric LCD ("FLCD") devices. The light valve modulates the light, which is projected onto a display screen 57 through a projection lens 59. This system is only one of many configurations of display systems that could use a recirculating polarization light integrator according to embodiments of the present invention.

IV. Experimental Results

Polarization recovery light pipes according to various embodiments of the present invention were modeled and tested. The general concept is that light having the selected polarization is transmitted through the reflective polarizer while light having the non-selected polarization is reflected back into the light pipe. The back-reflected light is reflected off the mirror on the input face back towards the polarizer. During one round trip, the polarization state changes due to phase shifts arising from TIRs, phase shift coatings, retarder plates, or other polarization modifiers. Recovered light converted to the selected polarization state is transmitted by the polarizer.

Gain is the increase in intensity of the polarized light at the light pipe end (exit) face compared to where no polarization recovery is present. Gain is dependent upon polarization conversion efficiency, among other factors. Generally, the higher the polarization conversion efficiency, the higher the theoretical gain. In an exemplary system, the reflectivity of the polarizer and the transmissivity of the polarizer were both modeled at about 86%. The aperture ratio was modeled at 0.21, and the mirror reflectivity at 0.96 (neglecting other loss mechanisms), which produces a gain of 0.089 for a conversion efficiency of 0.15, but 0.264 for a conversion efficiency of 0.85. Thus it is desirable to have conversion efficiency above about 0.4, and particularly desirable to have conversion efficiency above 0.7, where the gain curve starts to flatten out.

Figure 5A:
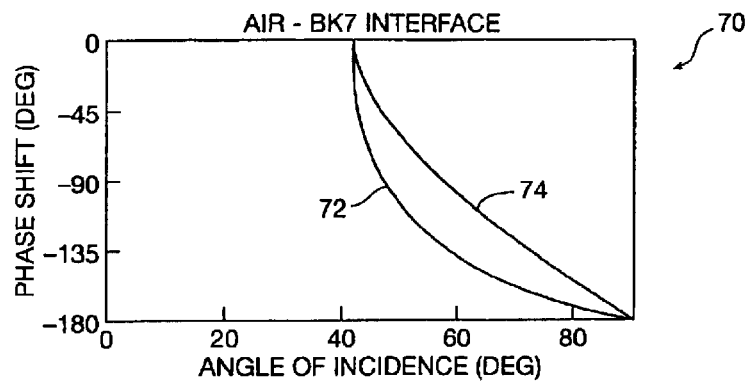
FIG. 5A is a graph illustrating phase shift versus angle of incidence for polarized light in an exemplary light pipe.
Figure 5B:
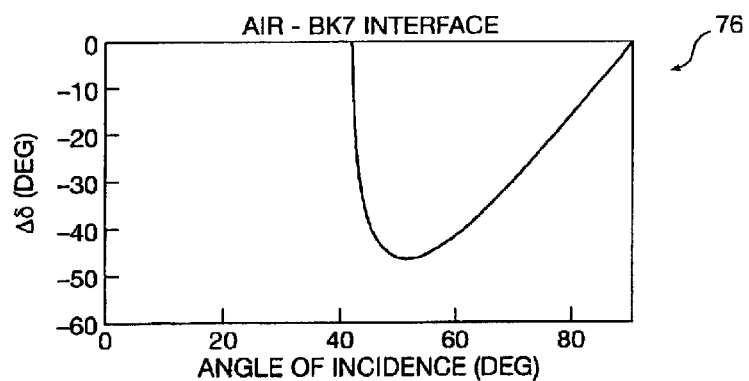
FIG. 5B is a graph illustrating the derivative of phase shift versus angle of incidence in an exemplary light pipe.

FIG. 5A is a graph 70 illustrating phase shift versus angle of incidence for polarized light in an exemplary light pipe made of BK-7™ glass. The phase shift for p-polarized light 72 is different than that for s-polarized light 74. FIG. 5B is a graph 76 illustrating the difference in phase shift ($\delta$) versus angle of incidence for the curves shown in FIG. 5A. These graphs illustrate that a maximum difference in phase shift between about 45–55 degrees (angle of incidence to the normal to the wall of the light pipe).

In a typical light pipe, the small angular distribution of the light and the length of the light pipe lead to only 2–3 reflections (TIRs) during one round trip. The number of reflections can depend in part on the wavelength of the light. A typical light pipe carries light made up of red, green, and blue components. Such a small number of reflections results in a polarization conversion efficiency of about 0.0.03 and a gain of about 0.02 or less. However, if a quarter-wavelength phase retarder of 90 degrees is placed at the entrance surface, the polarization conversion efficiency increases to 0.85 and the predicted gain is about 0.28.

Figure 6:
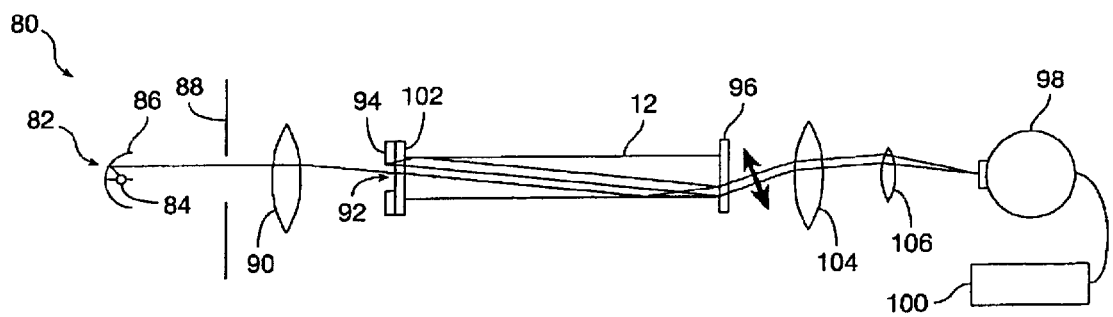
FIG. 6 is a simplified diagram of a test set-up for measuring recovered polarized light.

FIG. 6 is a simplified diagram of a test set-up 80 for measuring recovered polarized light. An ultra-high-pressure ("UHP") lamp 82 included a 1.3 mm arc 84 and a parabolic reflector 86. An iris 88 and lens 90 produced an f/1.8 at the aperture 92 of the light pipe 12. The aperture was clear with an anti-reflective coating, but the remaining portion of the input end of the light pipe was coated with a reflector 94. The aperture had a diameter of about 5 mm. A wire grid polarizer 96 was coupled to the other end of the light pipe, and the output from the polarizer was measured using an integrating sphere 98 and a scanning photometer 100, such as a SPECTRA SCAN Model PR650. The output was measured with and without a quarter-wavelength (NITTO sheet) retarder plate 102. Lenses 104, 106 focused the light from the exit end of the light pipe to the integrating sphere.

Figure 7:
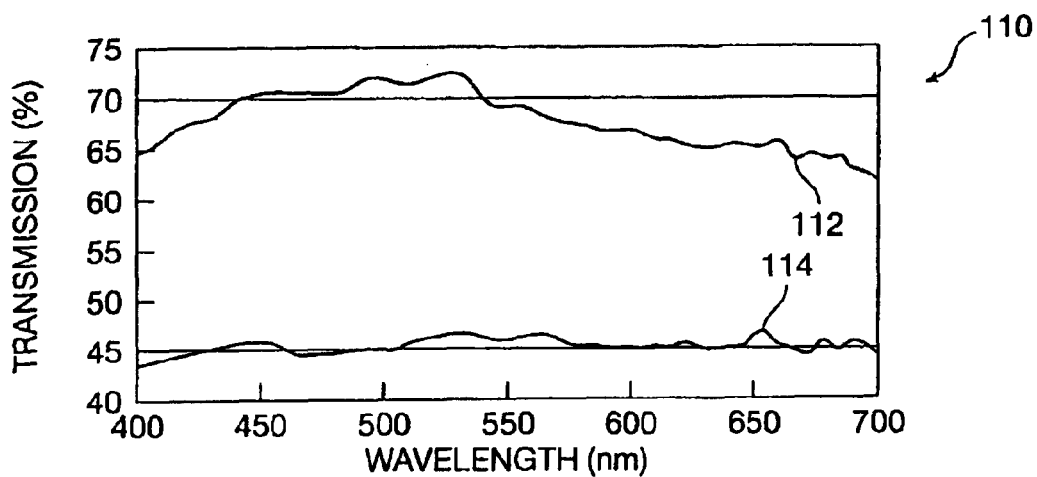
FIG. 7 is a simplified graph illustrating relative light efficiency with and without a retarder.

FIG. 7 is a simplified graph 110 illustrating relative light efficiency of the system shown in FIG. 6 with and without the retarder plate (ref. num 102). The polarization recovery without the retarder 112 resulted in a gain of about 0.03. The polarization recovery with the retarder 114 resulted in a gain of about 0.25. The baseline was the light pipe with the aperture.

The results might improve further with optimization of the aperture diameter for the arc size of the lamp and f-number. In particular, reducing the aperture area is more important in a recycling light pipe where loss of reflected light out the aperture degrades light recovery. Another improvement might arise from optimizing the phase retardation of the sheet polarizer, particularly to color balance according to the extinction ratio of the polarizer. Finally, it may be further desirable to use a high-transmission wire grid polarizer (at the expense of contrast), especially where it is desired to improve the total illumination of the SLM, or to decrease the difference in contrast ratios between the high and low ends of the light desired at the SLM.

V. Exemplary Methods

Figure 8:
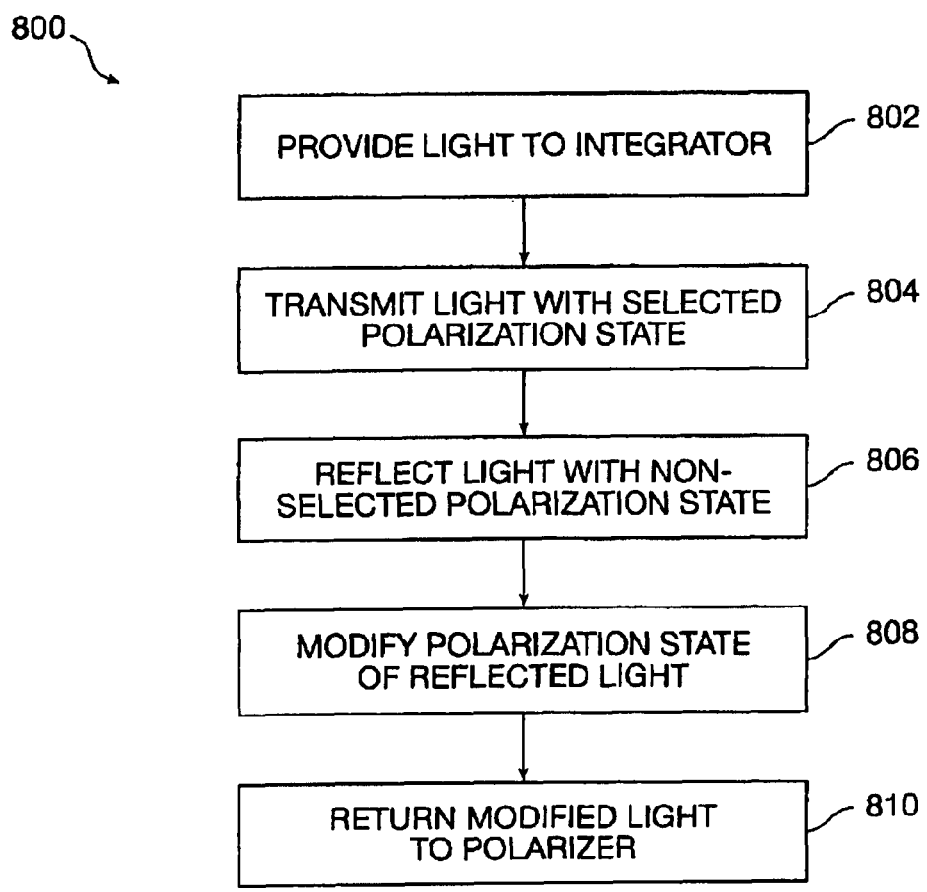
FIG. 8 is a simplified flow chart of a method for providing polarized light according to an embodiment of the present invention.

FIG. 8 is a simplified flow chart of a method 800 of providing polarized light according to an embodiment of the present invention. A light source, such as a lamp, provides light to a recirculating polarization light integrator (step 802). The recirculating polarization light integrator includes a polarizer that transmits light of a selected polarization to a light valve (step 804) and reflects light of non-selected polarization (step 806). Polarization modification may occur from reflections off the sides and end(s) of a light pipe or light tunnel, or the recirculating polarization light integrator may include one or more optical phase-shifting elements, such as phase-shifting coatings on one or more sides or surfaces of the light integrator, a retarder plate, or a birefringent optical element, or other polarization state modifier, including in combination.

The polarization state modifier rotates at least some of the non-selected light to the selected polarization state (step 808) and returns it to the polarizer (step 810). This sequence may be repeated several times. Some light is typically lost due to absorption, reflection losses, through the input aperture, or otherwise. The light transmitted through the polarizer is generally greater than half the light provided to the recirculating light integrator.

While the invention has been described above with respect to certain specific embodiments, the invention may be embodied in other specific forms without departing from the spirit of the invention. Thus, the embodiments described above illustrate the invention, but are not restrictive of the invention, which is indicated by the following claims. All modifications and equivalents that come within the meaning and range of the claims are included within their scope.

We claim:

1. A recirculating light polarizer comprising:
a light pipe having an input face and an exit face, the input face including
an aperture and
a reflector; and
a reflective polarizer attached to the exit face.

2. The recirculating light polarizer of claim 1 wherein the reflective polarizer is a wire grid polarizer and further comprising an air gap between the exit face of the light pipe and wire grid polarizer.

3. The recirculating light polarizer of claim 2 wherein a wire grid side of the wire grid polarizer is disposed proximate to the air gap.

4. The recirculating light polarizer of claim 1 wherein the reflective polarizer is a wire grid polarizer and a wire grid side of the wire grid polarizer is disposed distal from the exit face of the light pipe.

5. The recirculating light polarizer of claim 1 further including a polarization state modifier disposed between the reflector and the reflective polarizer.

6. The recirculating light polarizer of claim 5 wherein the polarization state modifier comprises a retarder plate.

7. The recirculating light polarizer of claim 6 wherein the retarder plate provides about $N\lambda/4$ of retardation each time light passes through the retarder plate, wherein N is a non-negative integer and $\lambda$ is a wavelength of light passing through the retarder plate.

8. The recirculating light polarizer of claim 6 wherein the retarder plate has a red-light transmission loss that is less than a blue-light transmission loss.

9. The recirculating light polarizer of claim 6 wherein the retarder plate has a red-light transmission loss that is greater than a blue-light transmission loss.

10. The recirculating light polarizer of claim 5 wherein the polarization state modifier comprises a birefringent element.

11. The recirculating light polarizer of claim 1 further comprising a phase control coating.

12. The recirculating light polarizer of claim 11 wherein the light pipe comprises a rectangular light pipe and the phase control coating is disposed on a first wall of the rectangular light pipe and on a second wall of the rectangular light pipe.

13. The recirculating light polarizer of claim 11 wherein the phase control coating is disposed at an oblique angle with respect to an optical axis of the light pipe.

14. The recirculating light polarizer of claim 13 wherein the oblique angle is about 45 degrees from an optic axis of the light pipe.

15. The recirculating light polarizer of claim 11 wherein the reflector of the input face is angled with respect to an optic axis of the light pipe and the phase control coating is disposed on a surface of the input face.

16. The recirculating light polarizer of claims 11 wherein the reflector is a corner cube-type reflector and the phase control coating is disposed on a surface of the corner cube-type reflector.

17. The recirculating light polarizer of claim 1 wherein the input light coupled to the light pipe through the aperture has a first spectral distribution and an output light from the reflective polarizer has a second spectral distribution.

18. The recirculating light polarizer of claim 1 wherein the light pipe is a tapered light pipe.

19. The recirculating light polarizer of claim 1 wherein the light pipe comprises a light rod.

20. The recirculating light polarizer of claim 1 wherein the light pipe comprises a light tunnel.

21. The recirculating light polarizer of claim 1 wherein the reflective polarizer is attached to the exit face so that a reflective plane of the reflective polarizer is essentially normal to an optic axis of the light pipe.

22. A recirculating light polarizer comprising:
a light integrator having an input face and an exit face, the input face including
an aperture and
a reflector; and
a wire grid polarizer optically coupled to the exit face.

23. A recirculating light polarizer comprising:
a light pipe having an input face and an exit face, the input face including
an aperture and
a reflector; and
a reflective polarizer optically contact bonded to the exit face of the light pipe.

24. A recirculating light polarizer comprising:
a light integrator having an input face and an exit face, the input face including
an aperture and
a reflector;
a reflective polarizer optically coupled to the exit face; and
a retarder plate disposed between the reflector and the reflective polarizer,
wherein the retarder plate provides about $N\lambda/4$ of retardation each time light passes through the retarder plate, wherein N is an integer greater than 1 and $\lambda$ is a wavelength of light passing through the retarder plate.

25. A recirculating light polarizer comprising:
a light integrator having an input face and an exit face, the input face including an aperture and
a reflector;
a reflective polarizer optically coupled to the exit face; and
a retarder plate disposed between the reflector and the reflective polarizer,
wherein the retarder plate provides retardation less than $N\lambda/4$ and light traveling from the reflective polarizer to the reflector and back to the reflective polarizer accumulates a total retardation of about $N\lambda/2$, wherein N is a non-negative integer and $\lambda$ is a wavelength of light passing through the retarder plate.

26. A recirculating light polarizer comprising:
a light pipe of birefringent glass having an input face and an exit face, the input face including
an aperture and
a reflector; and
a reflective polarizer optically coupled to the exit face.

27. A recirculating light polarizer comprising:
a light pipe having an input face and an exit face, the input face including
an aperture and
a reflector;
a reflective polarizer attached to the exit face; and
a polarization state modifier disposed in an optical path between the reflective polarizer and the reflector.

28. The recirculating light polarizer of claim 27 further comprising a second polarization state modifier.

29. A recirculating light polarizer comprising:
a light pipe having an input face and an exit face, the input face including
an aperture and
a reflector;
a reflective polarizer optically coupled to the exit face; and
a retarder plate disposed between the reflective polarizer and the reflector, the retarder plate providing retardation less than $N\lambda/4$ and light traveling from the reflective polarizer to the reflector and back to the reflective polarizer accumulates a total retardation of about $N\lambda/2$, wherein N is an odd non-negative integer and $\lambda$ is a wavelength of light passing through the retarder plate.

30. A recirculating light polarizer comprising:
a light pipe having an input face and an exit face, the input face including
an aperture and
a reflector;
a reflective polarizer attached to the exit face; and
a phase control coating disposed between the reflective polarizer and the reflector.

31. A recirculating light polarizer comprising:
a light pipe having an input face and an exit face, the input face including
an aperture configured to couple light with a first spectral distribution to the light pipe and
a reflector;
a reflective polarizer optically coupled to the exit face configured to provide light with a second spectral distribution from the recirculating light polarizer.

32. A projection display system comprising:
a light source providing unpolarized light to
a recirculating polarizing light pipe having a reflective polarizer attached to an exit face of the recirculating polarizing light pipe so that a reflective plane of the reflective polarizer is essentially normal to an optic axis of the light pipe to convert the unpolarized light to polarized light and to provide the polarized light to
a light valve, the light valve being optically coupled to
a display screen.

33. A method of providing polarized light, the method comprising the steps of:
providing light to an input aperture of a light pipe optically coupled to a reflective polarizer having a reflective plane essentially normal to an optic axis of the light pipe;
transmitting a first portion of the light having a first polarization state through the reflective polarizer;
reflecting a second portion of the light having a second polarization state back into the light pipe;
modifying the second polarization state of the second portion of the light to obtain a third portion of light having the first polarization state; and
transmitting the third portion of light through the reflective polarizer.

* * * * *